United States Patent [19]

Hale

[11] 4,083,087
[45] Apr. 11, 1978

[54] FLEXIBLE PIPE CLAMP ASSEMBLY
[76] Inventor: C. Clark Hale, P.O. Box 409, McComb, Mass. 39648
[21] Appl. No.: 786,776
[22] Filed: Apr. 12, 1977
[51] Int. Cl.² .................. B65D 63/06; F16L 55/16
[52] U.S. Cl. ............................. 24/21; 138/99
[58] Field of Search ........ 24/19, 20 R, 20 W, 20 CW, 24/20 TT, 20 S, 21, 25; 138/99

[56] References Cited
U.S. PATENT DOCUMENTS

| 624,770 | 5/1899 | Elbee | 138/99 |
| 1,072,253 | 9/1913 | Peck | 138/99 |

FOREIGN PATENT DOCUMENTS

| 372,259 | 2/1907 | France | 138/99 |
| 421,634 | 4/1926 | Germany | 24/25 |

Primary Examiner—Paul R. Gilliam
Assistant Examiner—Kenneth J. Dorner
Attorney, Agent, or Firm—Watson, Cole, Grindle & Watson

[57] ABSTRACT

A clamp assembly for securing a band about a flexible pipe includes a plurality of substantially U-shaped members clamping the ends of the band together as they are wrapped about pin members having axial undercuts therein. The pins are so disposed that their undercuts face away from one another, and legs of the clamps have ends complementary in shape with the undercuts so as to force portions of the band lying between the pins and the clamp member into intimate contacting engagement with the undercuts.

5 Claims, 4 Drawing Figures

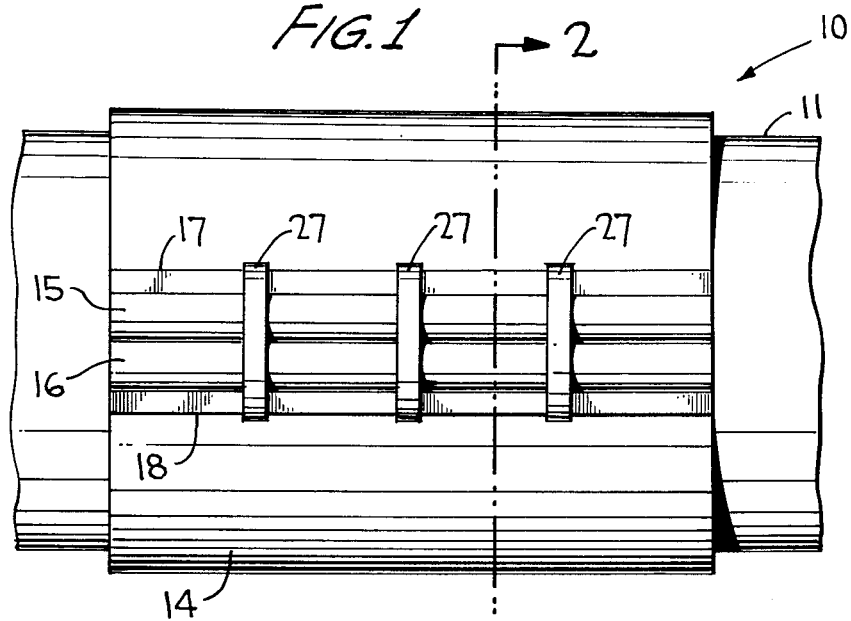
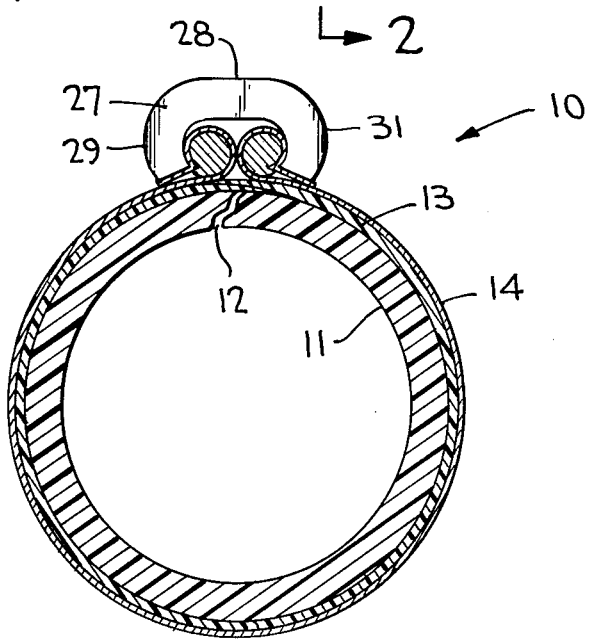
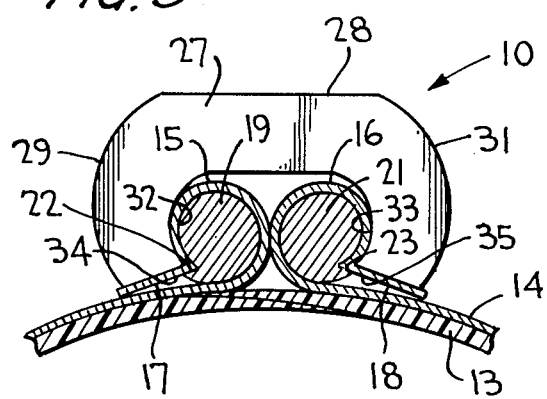
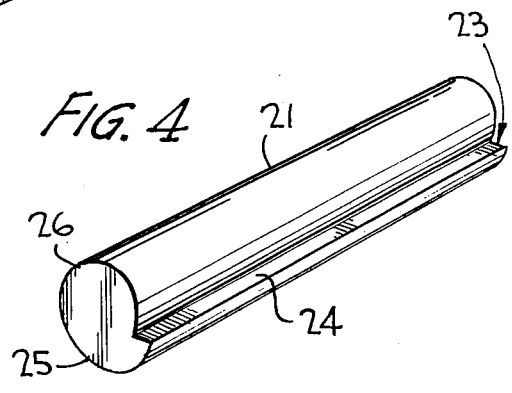

FLEXIBLE PIPE CLAMP ASSEMBLY

BACKGROUND OF THE INVENTION

This invention relates generally to a clamp assembly for securing a band about a flexible pipe, and more particularly to such an assembly which includes a non-threaded clamp member which is locked in place about the ends of the band.

Clamp assemblies of different types have been devised in the past for the purpose of repairing flexible pipes, especially water hoses and the like. A flexible band normally surrounds a ruptured portion of the pipe, the band having bent-back spaced-apart ends for the reception of lugs which are held together and tightened by means of a bolt and nut arrangement as in U.S. Pat. No. 2,834,086. Or, the legs of staple-shaped retainers in engagement with bent-back ends of a flexible band have been used for maintaining the band in place, as shown in U.S. Pat. No. 1,914,790. Other clamp assemblies include the use of tapered tighteners engageable with bent-back ends of the band for holding it in place.

However, the known clamp assemblies utilized in repair kits for flexible pipes oftentimes prove cumbersome to assemble and unreliable throughout their extended use since they are apt to loosen to such an extent as to diminish their effectiveness.

SUMMARY OF THE INVENTION

It is therefore an object of the present invention to provide a clamp assembly for securing a band about a flexible pipe with the use of a pair of pins and at least one clamp member cooperating with the pins so as to tightly maintain ends of the band together without the need for a threaded tightener and so as to substantially avoid any loosening after installation.

The pins of the present clamp assembly have axially disposed undercut portions, ends of the band being wrapped about the pins with portions thereof overlying the undercuts. The clamp member is installed transversely of the pins and has its legs shaped complementary to the undercuts so as to force the overlying portions of the band ends into intimate contact with the undercuts upon installation of the clamp. A resilient cover surrounding the pipe to be repaired may be disposed beneath the band.

BRIEF DESCRIPTION OF THE DRAWINGS

FIG. 1 is a top plan view of a clamp assembly in accordance with the invention shown in its relation to a flexible pipe to be repaired;

FIG. 2 is a sectional view taken substantially along line 2—2 of FIG. 1;

FIG. 3 is a view similar to FIG. 2 showing at a slightly enlarged scale details of the clamp assembly of the invention; and FIG. 4 is a perspective view of one of the pin members of the clamp assembly.

DETAILED DESCRIPTION OF THE INVENTION

Turning now to the drawings wherein like reference characters refer to like and corresponding parts throughout the several views, a clamp assembly generally designated 10 is shown surrounding a flexible pipe or hose 11 and disposed over a rupture or break 12 of the hose to be repaired. A flexible cover 13 of elastomeric material such as rubber or plastic and having tapered overlapping ends may be provided for surrounding hose 11 for completely covering break 12. Cover 13 should therefore be of sufficient length to completely cover the hose break or rupture, and a band 14 of flexible and malleable material, having a length substantially the same as the length of cover 13, is bent about the cover for completely surrounding same. As shown more clearly in FIG. 3, band 14 has outwardly curled ends 15 and 16, the band being of sufficient width to permit ends 15 and 16 to be curled so as to at least wrap around pin members 19 and 21. And, the band may be sufficiently wide to further present outwardly extending flanges 17 and 18 formed in the manner to be hereinafter described.

Pin members 19 and 21, about which ends 15 and 16 of the band are respectively curled, are of a length substantially equal to the length of cover 13 and band 14 (see FIG. 1). As shown in FIGS. 3 and 4, the pin members are substantially cylindrical except that they have undercut portions 22 and 23 formed in the outer surfaces thereof. Each such undercut portion is defined by a plane surface 24 intersecting the outer surface of the pin, and is further defined by a surface 25 of variable radius merging with the remainder 26 of the outer surface.

A plurality of substantially U-shaped clamp members 27 (at least one clamp member being required depending on the width of the band) are spaced along the length of the pin members as shown in FIG. 1, and are disposed transversely of the pin members for effectively clamping and holding band 14 tightly in place. Each clamp member is substantially U-shaped as shown and has a base portion 28 bridging the pair of pin members, and further has curved leg members 29 and 31 extending from base portion 28. Inner edges 32 and 33 of the leg members are each of a variable radius and lie respectively parallel to surfaces 25 of the pin members. And, outer end edges 34 and 35 of the leg members lie parallel to the respective plane surfaces 24 of the pin members. The intersection between edges 32, 34 and 33, 35 respectively present pointed tips 36 and 37 extending into the crease defined between surfaces 24 and 25 of the pin members. The distance between tips 36 and 37 may be less than the combined thickness of the pin members plus four times the gauge thickness of band 14.

In the assembly operation of the clamp assembly, band 14 is bent directly about the area of the hose to be repaired, or about cover 13 which is first applied about the hose over the break or rupture 12. Pin members 19 and 21 are held in position over the free ends of band 14, and such ends are curled thereover while orienting the pin members to a position wherein their undercuts face substantially away from one another. One or more clamp members 27 are then pressed over the curled ends of the band toward the flexible pipe and, due to the relative spacing between tips 36 and 37, these tips may serve to bight into outer surfaces of the curled ends so as to tighten the curl about the pin members and to cause the pin members to rotate in relatively opposite directions. The proper relative disposition of the undercuts and tips will permit the tips, during installation of a clamp, to force portions of ends 15, 16, which overlie the undercuts, into intimate engagement with the undercuts as shown. And, outwardly extending flanges 17 and 18 of the band will be accordingly formed from portions of the band ends which bend from the creases of the undercuts into facing contact with end edges 34 and 35 during clamp installation. Intimate contact between portions of the band and the undercuts will be assured upon movement of clamp legs 29 and 31 together with the use of some suitable clamping tool.

Otherwise, a clamp member may be installed by forcing it into its transverse position from an initial position lying at an angle to the transverse axis of the pipe. A clamping tool may then be used to force legs 29 and 31 together for causing portions of the band to intimately engage surfaces 24 and 25 of the pin members. And, if desired, tips 36 and 37 may be spaced apart a distance slightly greater than the combined thickness of the pins plus four times the gauge thickness of the band, since the legs of the clamp will be ultimately forced together with the use of the tool.

Regardless of the mode of installation, it will be seen that any forces attempting to separate the clamp leg members will be resisted by the interengagement between the leg members and the undercut portions of the pin members, so that the band remains tightly clamped in place.

It should be noted that each of the clamps 27 may be of a sufficient thickness for stability purposes, and that the tool used in pressing the clamp leg members together may have movable clamping jaws, which tool forms no part of the present invention.

Also, the pin members may be other than substantially circular as shown, without departing from the scope of the present invention. A clamp assembly has been devised wherein the clamp members are positively retained in place, are easily installed and are readily removable without the need for threaded elements as sometimes provided in the past. A tight and secure clamping operation is effected between the clamp leg members and the undercut portions of a pair of uniquely designed pin members. And, a minimum number of parts is required for the present assembly which is capable of being easily and effectively installed without the use of any special tools or special instructions.

Obviously, many modifications and variations of the invention are made possible in the light of the above teachings. It is therefore to be understood that within the scope of the appended claims the invention may be practiced otherwise than as specifically described.

What is claimed is:

1. A clamp assembly for securing a band about a flexible pipe, the band being flexible and having outwardly curled ends, and elongated pins engageable with said curled ends, comprising, said pins having co-axial undercut portions located in the outer surfaces thereof, said pins lying within said curled ends and being so disposed that said undercut portions thereof face away from one another, portions of said curled ends overlying said undercut portions, and at least one resilient clamp member having portions thereof extending toward one another and being complementary in shape to said undercut portions, said clamp member extending transversely of said pins, said complementary portions of said clamp member engaging said overlying portions of said ends for forcing said overlying portions into intimate contacting engagement with said undercut portions, whereby said band is securely held about the flexible pipe while said clamp member is locked in place with said complementary portions and said overlying portions being seated within said undercut portions.

2. The assembly according to claim 1, wherein said undercut portions extend along the entire length of said pins, and a plurality of clamp members are spaced along said pins and extend transversely thereof, each said clamp member having portions thereof extending toward one another and being complementary in shape to said undercut portions, said complementary portions engaging said overlying portions for forcing them into intimate contacting engagement with said undercut portions.

3. The assembly according to claim 1, wherein said clamp member is substantially U-shaped and has a base portion bridging said pins, said clamp member further having leg portions extending outwardly of said base portion, said leg portions having inner and end edges defining said complementary portions.

4. The assembly according to claim 3, wherein each said undercut portion is defined by a plane surface intersecting an outer surface of each said pin, and is further defined by a surface of variable radius merging with the remainder of said outer surface, said remainder surface having a fixed radius, and said inner and end edges of said leg portions respectively lying parallel to said surface of variable radius and to said plane surface of each said pin member.

5. The assembly according to claim 1, wherein a resilient closed cover underlies said band.

* * * * *